UNITED STATES PATENT OFFICE.

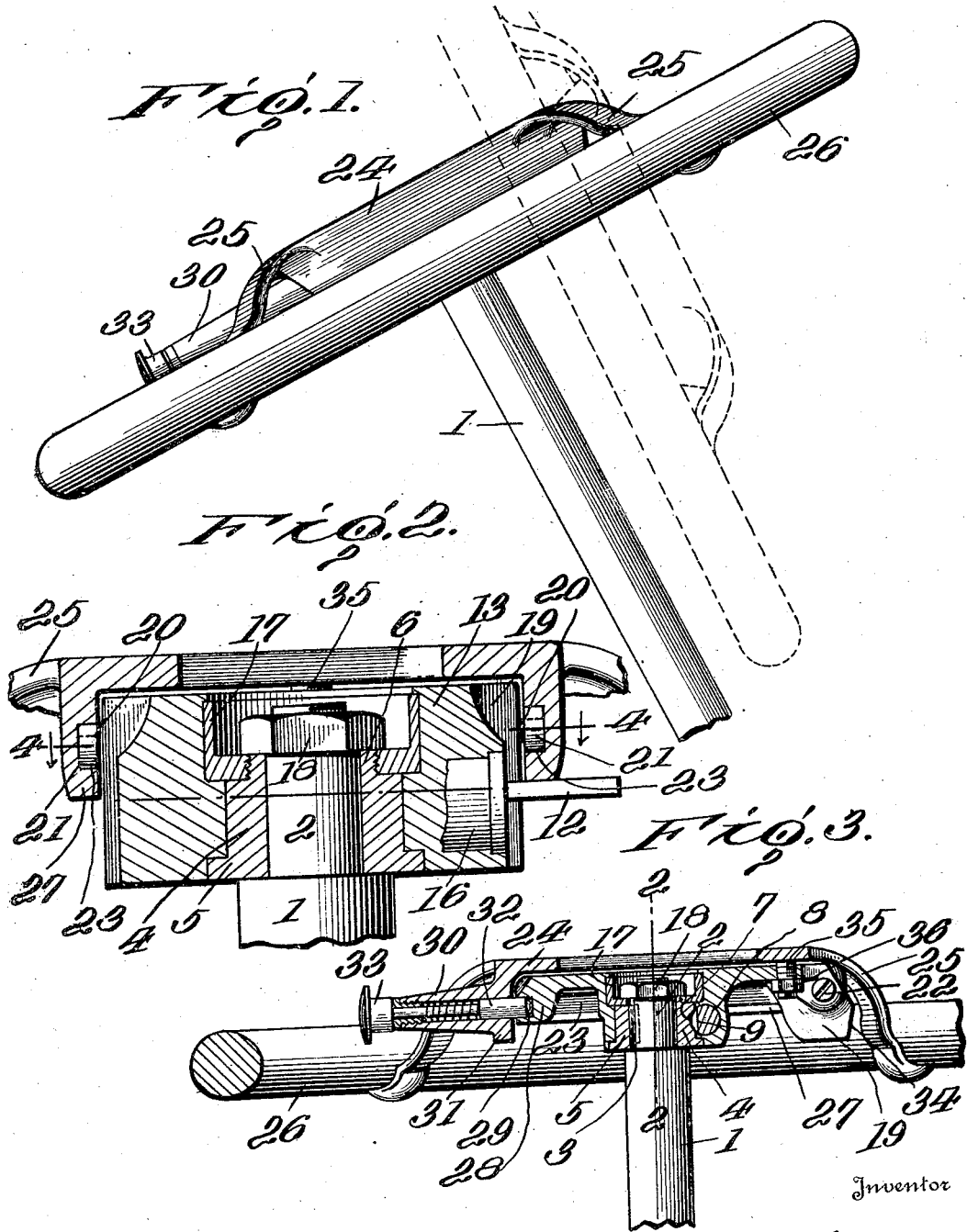

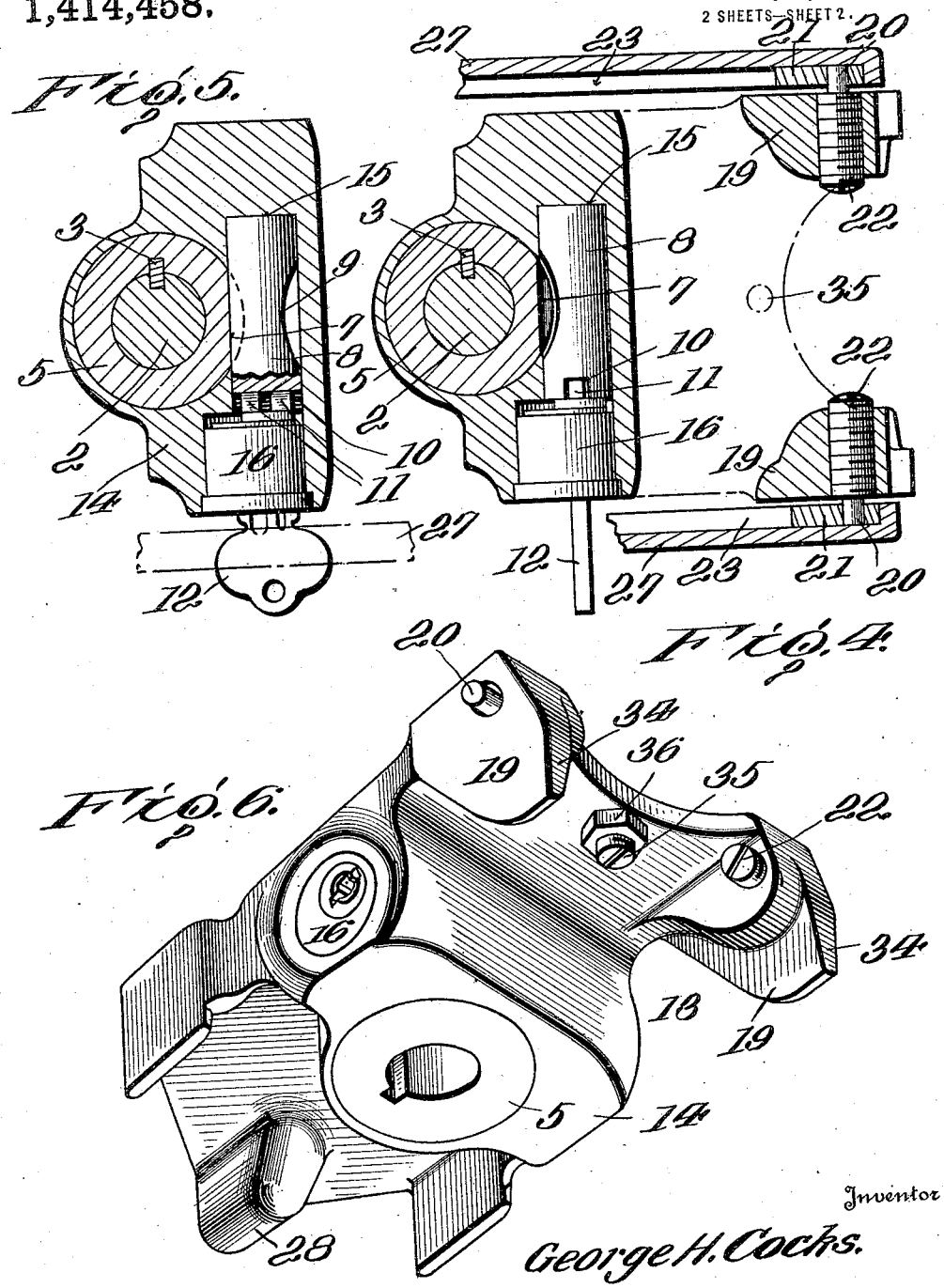

GEORGE H. COCKS, OF ADRIAN, MICHIGAN.

COMBINED TILTING AND SLIDING STEERING WHEEL.

1,414,458.   Specification of Letters Patent.   Patented May 2, 1922.

Application filed October 17, 1921. Serial No. 508,173.

*To all whom it may concern:*

Be it known that I, GEORGE H. COCKS, a citizen of the United States, residing at Adrian, in the county of Lenawee and State of Michigan, have invented certain new and useful Improvements in Combined Tilting and Sliding Steering Wheels, of which the following is a specification.

This invention relates to tilting and sliding steering wheels for automobiles and the like; and it comprises means in combination with the steering post for tilting the wheel with respect to the post and sliding it to position at an angle to the post, together with means for releasing the steering wheel from steering engagement with the post and for locking such means in said released position; all as more fully hereinafter set forth and as claimed.

In the art to which the present invention relates tilting steering wheels have been used to some extent, but these wheels have not been highly satisfactory because when tilted over the steering post they are not in position sufficiently far removed from the driver's seat. In order to overcome this disadvantage, it has been proposed to tilt the wheel and then slide it away from the driver on the post, or, in other words, to lower it when in tilted position.

My invention relates particularly to the latter type of device and comprises certain improvements. In known types of sliding and tilting wheels, the wheel itself in its tilted position comes in contact with the post, with the result that the wheel and steering post or column become scarred and damaged. According to my invention I provide mechanism for limiting the tilting movement of the wheel in order that it may not contact with the post. I also have so arranged the parts that when in steering position, the key carried by the lock, (when the steering post is locked to the wheel), is in a position so that it cannot be accidentally turned.

The provision of sliding and tilting mechanism for the type of wheel described necessarily involves the use of a number of mechanical elements which in course of time may wear and become loose and unsafe. I provide special mechanism for taking up loss due to wear of the parts. My invention comprises other details and improvements more fully hereinafter set forth.

In the accompanying drawings I have shown one form of a specific embodiment of my invention, in the several views of which similar reference numerals designate corresponding parts.

Fig. 1 is a side elevation of the wheel and a part of the post, showing the wheel in tilted position in dotted lines;

Fig. 2 is a vertical section along line 2—2 of Fig. 3;

Fig. 3 is a vertical section at right angles to the section shown in Fig. 2 and on a smaller scale;

Fig. 4 is a horizontal segmental section along line 4—4 of Fig. 2;

Fig. 5 is a section similar to Fig. 4 showing the key in position in the lock and bolt turned to lock the steering wheel, and Fig. 6 is a detail perspective of the sliding plate showing, particularly, the under side.

Referring to the drawings, 1 indicates a steering column attached to the steering gear of an automobile in the usual manner (connection to the wheels not being shown). Keyed to the upper part 2 of the steering post by means of key 3 is the bushing 4 flanged as at 5 and having the screw threaded extremity 6. The face of this bushing at one point is cut away or slotted as at 7, such slot having the contour of a bolt to be used in connection therewith. Adjacent the slot and fitted therein is bolt 8 which at one point along its length is cut away as at 9, the cut away portion of the bolt having the same radius as bushing 4. The bolt is provided at one end with means for locking the mechanism, here shown as the slotted portion 10 which may be engaged by a tang or lug 11 or the like extending from a known type of lock. Through provision of the mechanism described, the bolt 8 may be turned so that the cut away portion 9 is in engagement with the face of the bushing, whereupon the bolt and the plate in which it is carried may be turned freely around the bushing without driving the same. This plate will be hereinafter described. When the bolt is turned by means of the locking mechanism referred to so that the cut away portion 9 is away from the bushing and the straight portion of the bolt is in engagement with the recessed portion 7 of the bushing, the bushing and the bolt, together with the plate (to be described) are locked together (shown in Fig. 5) with the result that the steering post may be turned. This is the normal or driving position of the apparatus. In this position the key 12 is under the edge of the plate and cannot be turned. This serves to keep the bolt from being accidentally moved out of locking engagement with the bushing.

Mounted upon the bushing 4 is the plate 13, which may be a cast metal block having the housing surrounding the bushing. This plate is provided with a socket 15 in which bolt 8 fits with the slot 10 of the bolt outwardly. In the extremity of the socket there may be arranged the cylinder lock or the like 16 having the tang or shank 11 engaging the slot 10 of the bolt. According to this construction, the bolt 8 is carried by that portion of the plate which encircles the bushing and the bolt is adjacent the bushing. Through the arrangement described, the bolt may be turned and locked in position with the cut away portion 9 of the bolt free to ride around the face of the bushing 4. The plate 13 surrounds the bushing 4 as described, and is held in place by means of the cupped or flanged nut 17 threaded to the extremity 6 of the bushing and is held on the steering column by means of the nut 18.

The plate 13 is provided at one end with the opposite ears 19 which carry the lugs or pivots 20 mounted in slide blocks 21. These pivots may have the screw threaded extension 22 by means of which they are attached to the ears. The blocks 21 are arranged to ride in housing slots 23 in the spider plate 24 attached by means of the spider arms 25 to the rim 26. The slots or housings 23 are cut into downwardly projecting flanges 27 on the lower side of the spider plate and the side faces of the ears 19 ride against these flanges. The guides are closed.

At the end opposite the end carrying the ears, the plate 13 is provided with lug 28 recessed as at 29, and the spider carries the sleeve 30 in the downwardly projecting plate 31. This sleeve carries the spring-pressed pin 32 operated by handle 33, the pin fitting the recess 29 in the plate 13. Through this construction, the spider plate may be temporarily locked to the plate 13. The handle 33 is arranged at the portion of the steering wheel directly in front of the driver when the automobile wheels are straight, so that the driver may place his hand around the rim of the wheel and with his first and second fingers pull the handle 33 outwardly. Without moving his hand from the wheel, he may then tilt the same and slide it downwardly while in tilted position. The wheel is thus released and it can be swung forward until it is at approximately right angles to the plate 13, when the wheel can be lowered out of the line of vision of the operator.

The wheel or spider plate is prevented from swinging more than 90 degrees through the provision of the ears 19, the outer or face ends 34 of which engage the under face of the spider plate. The degree to which the wheel or spider plate may be swung with respect to the plate 13 depends upon the shape of the faces 34 of the ears 19 and any angle may be used. It is advantageous to arrange these parts to limit the tilting movement of the wheel to a point where it will not contact with the steering post.

In use the pin 33 or the walls of the socket 29 may wear away and the pivots 20 or blocks 21 or the metal around the slots 23 may become worn, so that there may be some lost motion. In order to take up this wear and prevent any lost motion at all, I provide the set screw 35 having the lock nut 36 on the under side of the plate 13. When this screw is forced toward the under side of the spider plate 24 it forms a 3-point bearing between itself and the two lugs or pivots 20 in the ears 19 and the spring pin 32. In this way the spider plate and the plate 13 may be locked in firm engagement.

I have thus provided means for taking up lost motion in the parts; I have provided mechanism for tilting and sliding the wheel and limiting it to a point where it does not contact with the steering post; I have provided, by the arrangement of parts, means for keeping the key and thus the bolt from turning when the bolt locks the steering wheel to the bushing and thus the steering post; and this is all done through the provision of relatively simple, strong and compactly arranged mechanical parts.

What I claim is:

1. Steering mechanism for automobiles and the like comprising a steering column, a member having a portion surrounding the top of the steering column adapted to be locked thereto, and said member provided near one end with means carrying pivots, a rim, a plate carried thereby and adapted to house the first said member, the said plate provided with slots for the reception of the said pivots, means for latching and releasing the plate to and from the said member, whereby the rim with its attached plate may be tilted upwardly and may be slid downwardly with respect to the plate-like member and the steering column, and extensions on the said means carrying the pivots, for engaging the said plate and limiting the tilting movement of the plate.

2. Steering mechanism for automobiles and the like comprising a steering column, a member having a portion surrounding the top of the steering column and adapted to be locked thereto, said member provided near one end with oppositely disposed ears carrying extensions, and pivots carried by said ears, a rim, a plate carried thereby and adapted to house said member, said plate provided with slots for the reception of said pivots, and means for latching and releasing the second plate to and from the said member, whereby the rim with its plate may be tilted upwardly to a point where the extensions of said ears on said member engage the plate, and whereby the wheel with its attached plate may be slid downwardly with respect to the said member and the steering column.

3. In an automobile steering wheel, a steering column, a plate-like member having a portion surrounding the top of the steering column and adapted to be locked thereto, said plate-like member provided near one end with pivots, a rim, a plate carried thereby and complementary to the first plate, said second plate carrying guides for the reception of said pivots, means for latching and releasing the plate-like member to and from the plate whereby the rim with its attached plate may be tilted upwardly and may be slid downwardly with respect to the plate-like member and the column, and adjusting means on the plate-like member between said pivots and said latching and releasing means, whereby the plate-like member and the said plate may be adjusted to take up wear.

4. In steering mechanism for automobiles and the like having two members, one slidable with respect to the other, means on one of the members provided with guides, pivots carried by the other member, and blocks on said pivots over which the guides slide.

5. A steering mechanism for automobiles and the like, comprising a steering column, a plate like member having a portion surrounding the upper end of the steering column, and adapted to be locked thereto, a rim, a plate like member carried by the rim, means for pivotally and slidably connecting the plate like member to the member carried by the steering column, and means for limiting the downward swing of the plate like member to prevent the rim from engaging the steering column.

6. A steering mechanism for automobiles and the like, comprising a steering column, a plate like member having a portion surrounding the upper end of the steering column and adapted to be locked thereto, a rim, a plate like member carried by the rim, pivots carried by the member carried by the steering columns and having sliding connections with the plate carried by the rim, and means for limiting the downward swing of the rim to prevent it from engaging the steering column.

7. A steering wheel for automobiles and the like, comprising a steering column, a plate like member having a portion surrounding the steering column and adapted to be locked thereto, downwardly extending ears carried by said member, pivots carried by the outer faces of the ears, a rim, a plate like member carried by the rim, and having slots adapted to receive the pivots carried by the ears, whereby the wheel is rocked forward on the pivots and slid downward and whereby the ears prevent it from swinging inwardly against the steering column.

8. A steering wheel for automobiles and the like, comprising a steering column, a plate like member having a portion surrounding the steering column and adapted to be locked thereto, outwardly extending pivots carried by said member, a rim, a plate like member carried by the rim and having grooves to receive the pivots, whereby the wheel may be tilted forward and slid down parallel to the column and means for limiting the inward movement of the wheel to prevent it from engaging the steering column.

In testimony whereof, I have hereunto affixed my signature.

GEORGE H. COCKS.